M. M. WILKIN.
NUT LOCK.
APPLICATION FILED JUNE 22, 1908.
903,255.
Patented Nov. 10, 1908.
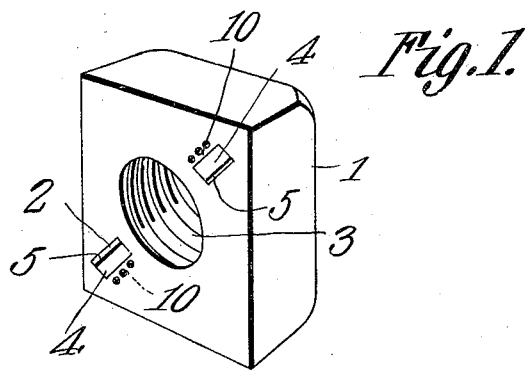
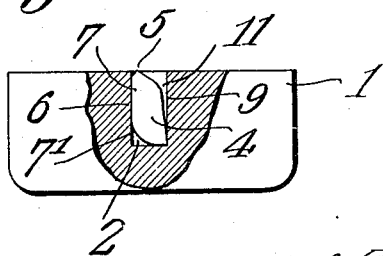
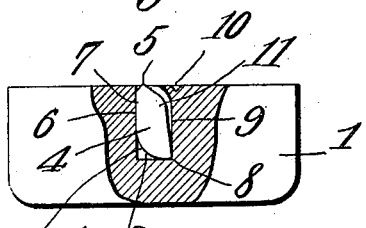
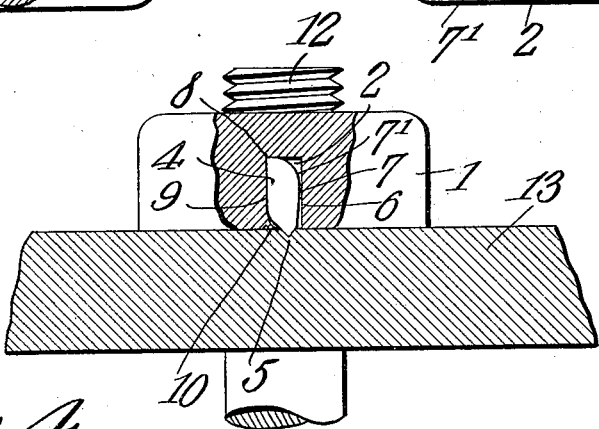
Witnesses
Inventor
Mark M. Wilkin
By C. A. Snow & Co.
Attorneys

UNITED STATES PATENT OFFICE.

MARK M. WILKIN, OF TRAVERSE CITY, MICHIGAN.

NUT-LOCK.

No. 903,255.   Specification of Letters Patent.   Patented Nov. 10, 1908.

Application filed June 22, 1908. Serial No. 439,817.

*To all whom it may concern:*

Be it known that I, MARK M. WILKIN, a citizen of the United States, residing at Traverse City, in the county of Grand Traverse and State of Michigan, have invented a new and useful Nut-Lock, of which the following is a specification.

This invention relates to nut locks and has for its object to provide an improved nut lock which will be locked in a very efficient manner to a plate against which it is screwed on a bolt, and will be prevented from becoming loose by jarring and turning back on the bolt.

The invention further has for its object to provide an improved nut lock which can be released from its locked position without injuring the nut or bolt, and which can be used over and over again.

The invention consists of a nut lock constructed as hereinafter set forth and claimed.

Referring to the drawing, Figure 1 is a view in perspective of a nut lock constructed in accordance with this invention. Fig. 2 is an edge view of the nut in section showing the locking tooth unconfined in its socket. Fig. 3 is an edge view of the nut in section showing the locking tooth confined in its socket. Fig. 4 is an edge view of the nut in section mounted on a bolt and in locked engagement with a plate.

In carrying out the invention a nut 1 is provided on its face with preferably two rectangular sockets 2 which may be located adjacent to two opposite corners of the nut on opposite sides of the bolt hole 3. Each socket 2 extends about half way through the nut; and has located therein a tooth 4, preferably of tempered steel with a broad sharp edge 5, normally projecting slightly beyond the mouth of the socket 2. The tooth 4 normally rests at an incline against one of the walls 6 of the socket 2 with the edge 5 located adjacent to the upper end of the wall 6. The tooth 4 has its sides formed with a straight portion 7, and a curved portion 7', the lower end of the tooth terminating in an edge 8 seated in a corner of the lower end of the socket. In the normal inclined position of the tooth in the socket there is a slight space between the side of the tooth and the wall 9 of the socket permitting of a slight rocking movement of the tooth 4. The tooth 4 is retained in the socket 2 by upsetting the bur adjacent to the edge of the socket 2 on one side to form a lip or projection 10 over the mouth of the socket 2, which is located above the shoulder 11 of the tooth so as not to interfere with its movement in the socket.

Fig. 2 shows the socket 2 before the projection 10 is formed, and Fig. 3 shows the socket with the projection. In Fig. 4 the nut is shown as screwed up on a bolt 12 against a plate 13, and in locked engagement therewith. When the nut 1 is screwed up against the plate 13 the curved upper portion of the tooth 4 rides smoothly over the face of the plate 13. After the nut 1 has been screwed up tightly against the plate 13 upon attempting to turn the nut back the edge 5 of the tooth will engage the face of plate 13 and the tooth 4 will tilt over in the socket 2 bringing the shoulder 11 of tooth 4 against the wall 9 of socket 2 thereby preventing the edge 5 of the tooth from further indenting the plate 13. The nut will then be effectively locked to the plate. To remove the nut it can be turned back with a powerful wrench, which causes the edge 5 of the tooth to peel off a small portion of the metal from the surface of plate 13 until the nut is turned back far enough on the bolt to disengage the tooth from the face of the plate. The nut can in this way be removed without being spoiled, thereby permitting of unlimited use.

Having described the invention, I claim:—

In a device of the character described, a nut having a rectangular socket in its face with one edge bent over to form a retaining lip, and a broad rocking tooth with a biting edge located in said socket, one side of said tooth having an upper straight portion and a lower curved portion, and the other side having an upper curved portion and a lower straight portion.

In testimony that I claim the foregoing as my own, I have hereto affixed my signature in the presence of two witnesses.

MARK M. WILKIN.

Witnesses:
A. B. CURTIS,
ALTHA SAXTON.